United States Patent [19]

Yasuda et al.

[11] Patent Number: 5,058,389
[45] Date of Patent: Oct. 22, 1991

[54] FLUID TEMPERATURE CONTROL SYSTEM AND COMPUTER SYSTEM USING SAME

[75] Inventors: Hiromu Yasuda, Shizuoka; Takahiro Daikoku, Ushiku; Kenji Takahashi, Abiko; Shizuo Zushi, Hadano; Tetsuji Yamashita, Shizuoka; Tomio Yoshikawa; Kyoshiro Murakami, both of Shimizu, all of Japan

[73] Assignee: Hitachi, Ltd., Tokyo, Japan

[21] Appl. No.: 507,871

[22] Filed: Apr. 12, 1990

[30] Foreign Application Priority Data

Apr. 17, 1989 [JP] Japan .................... 1-095138

[51] Int. Cl.$^5$ .............................. H02B 1/00
[52] U.S. Cl. .......................... 62/99; 62/178; 62/201; 361/385
[58] Field of Search ............. 62/201, 178, 185, 99; 361/385

[56] References Cited

U.S. PATENT DOCUMENTS 4,147,299  4/1979  Freeman ............. 361/381 X
4,512,161  4/1985  Logan et al. ........ 62/201 X

FOREIGN PATENT DOCUMENTS 56-24622   3/1981  Japan .
56-157745 12/1981  Japan .

Primary Examiner—William E. Wayner
Attorney, Agent, or Firm—Antonelli, Terry, Stout & Kraus

[57] ABSTRACT

A heating portion is cooled by a fluid, thereby effecting a temperature control. The temperature of the fluid is measured at the time of starting of a system, and the measured fluid temperature is compared with a set temperature. In accordance with the result of the comparison, the timing of starting the operation of LSI chips and the timing of starting the operation of a refrigerator are controlled.

23 Claims, 19 Drawing Sheets

F I G. 3
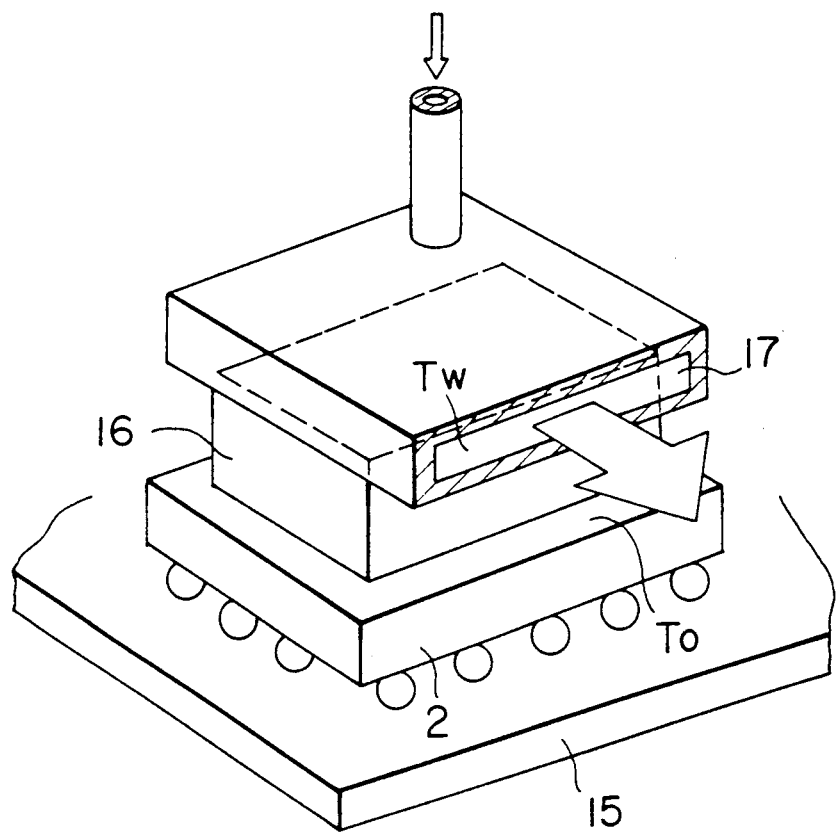

F I G. 13
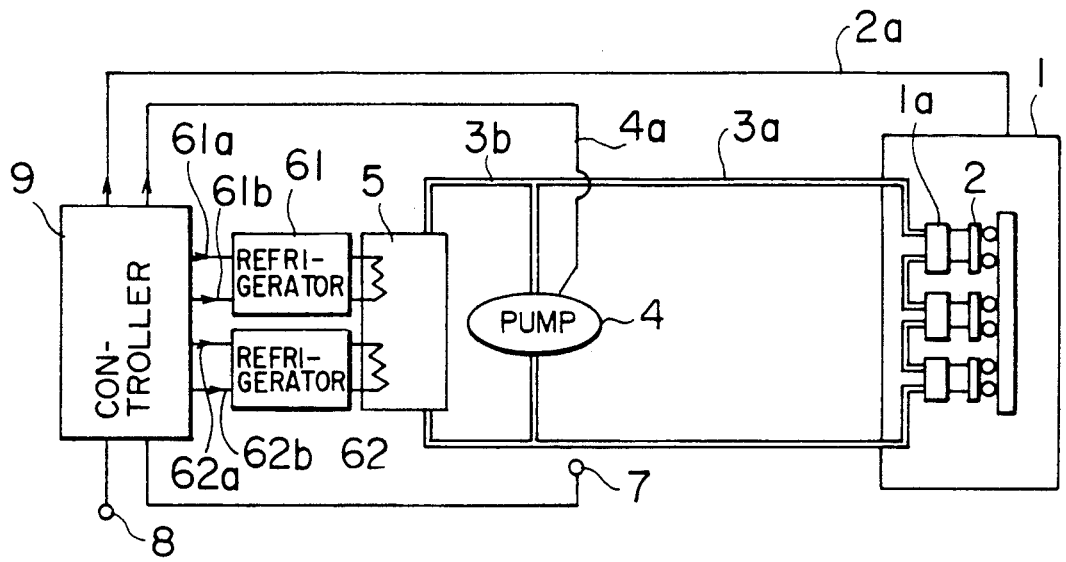
F I G. 14
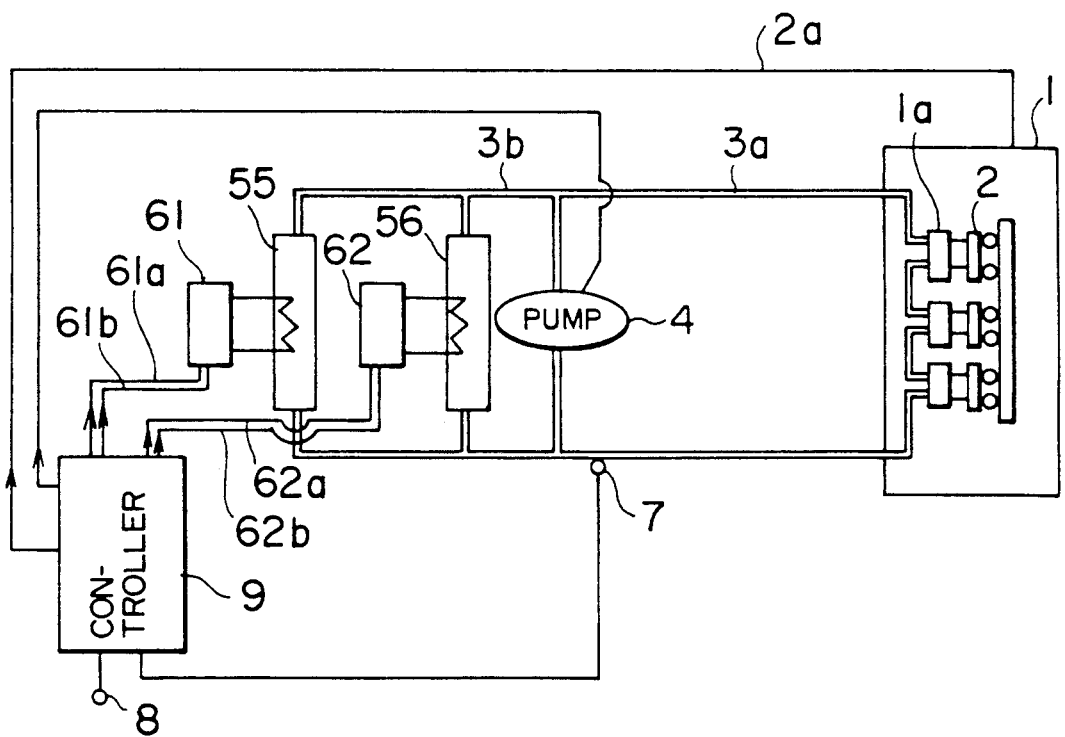

FLUID TEMPERATURE CONTROL SYSTEM AND COMPUTER SYSTEM USING SAME

BACKGROUND OF THE INVENTION

This invention relates generally to a fluid temperature control system for cooling a heat generating portion by fluid to effect a temperature control, and more particularly to a fluid temperature control system for effecting precise temperature control, for example, in order to cool a computer, and also to a computer system using such control system.

In a conventional apparatus as disclosed in Japanese Patent Unexamined Publication No. 56-157745, a plurality of refrigerators are provided, and the temperature of water fed through a main feed pipe, temperature at an inlet of each of the refrigerators and the flow rate of the circulating water through a main return pipe are detected. The inlet temperature of each refrigerator is compared with a set temperature, using a computer, and the number of the refrigerators to be operated is controlled or determined, thereby controlling the temperature of the water circulating through a heat generating portion.

In a system disclosed in Japanese Patent Unexamined Publication No. 56-24622, a power source for a computer is turned on, and a constant-voltage/constant-frequency power source is operated under the control of a controller. After the operation of the latter power source becomes steady, the operation of an air conditioner is started, and after temperature and moisture conditions become constant within predetermined ranges, the power source for the devices constituting the computer system is turned on. However, in such conventional systems, no means are provided for rapidly controlling the fluid temperature to the set temperature when starting the operation and, since the temperature of the circulating water is controlled by changing the number of the refrigerators to be operated, the water supplied to a heat generating portion is subjected to large temperature variations; and the starting and the stopping of the refrigerators must be done frequently. Therefore, it has been desired to rapidly control the fluid temperature to the set temperature so as to bring the computer into a usable condition in a short time, thereby enhancing the efficiency of its use; to precisely control the fluid temperature to the optimum temperature for operating LSI chips in a stable manner; and to improve the reliability of the system.

SUMMARY OF THE INVENTION

It is a first object of this invention to provide a fluid temperature control system which can rapidly control the fluid temperature to a set temperature when starting the operation of the system.

A second object of the invention is to provide a fluid temperature control system in which the fluid supplied to a heat generating portion is subjected to small temperature variations.

A third object of the invention is to provide a fluid temperature control system in which the frequency of starting and stopping of refrigerators is reduced, thereby enhancing the reliability of the system.

A fourth object of the invention is to provide a fluid temperature control system which can serve the purpose even when the construction of the system is subjected to a change such as the addition of an associated part or device.

The first object of the invention has is achieved by a fluid temperature control system of the invention in which a pump for circulating fluid is first operated after operating the system, and then the average fluid temperature is measured, and the average fluid temperature is compared with a set temperature. In accordance with the result of this comparison, the timing of starting the operation of LSI chips and the timing of starting the operation of refrigerators are controlled. The refrigerators can be pre-operated before the starting of the system.

The second object of the invention is achieved by a fluid temperature control system of the invention in which a cooling capacity of refrigerators is continuously variable, and in accordance with the fluid temperature measured at predetermined time intervals, the above cooling capacity is controlled by PID (proportional plus integral plus differential) control so that the fluid temperature is brought into a set temperature.

The third object of the invention achieved by a fluid temperature control system of the invention in which an outlet side of a compressor is connected to an outlet side of a pressure reducer by a bypass pipe, and a refrigerant flow rate control valve is provided in the bypass pipe. Alternatively, an inverter-driven compressor is incorporated in refrigerators.

The fourth object of the invention is achieved by a fluid temperature control system of the invention in which constants used for controlling the timing of starting the operation of a heat generating portion and the timing of starting the operation of refrigerators are corrected by the studying.

First, in the fluid temperature control system of the invention, since the pump for circulating the fluid is operated at the time of starting the system as described above, the temperature distribution of the fluid in the flow path becomes small. Therefore, the fluid temperature before the operation can be accurately measured, and, in accordance with the result of the comparison between the measured fluid temperature and the set temperature, the timing of starting the operation of the LSI chips and the timing of starting the operation of the refrigerators are controlled. Therefore, the fluid temperature can be rapidly controlled to the set temperature. Also, by pre-operating the refrigerators, a more rapid control can be achieved since the start-up the refrigerators is quick.

Second, in the fluid temperature control system of the invention, the cooling capacity of the refrigerators is continuously variable, and the cooling capacity is controlled by the PID (proportional plus integral plus differential) control in accordance with the fluid temperature measured at predetermined time intervals so that the fluid temperature can be brought into the set temperature, and the control constants are suitably determined. Therefore, the temperature control can be effected with small error and variation relative to the set temperature.

Third, in the fluid temperature control system of the invention, the outlet side of the compressor is connected to the outlet side of the pressure reducer by the bypass pipe, and the refrigerant flow rate control valve is provided in the bypass pipe. Alternatively, the inverter-driven compressor is incorporated in the refrigerator. Therefore, the cooling capacity can be controlled over a wide range, and the frequency of starting and stopping of the refrigerator can be reduced.

Fourth, in the fluid temperature control system of the invention, the timing of command for starting the operation of the LSI chips and the timing of command for starting the operation of the refrigerator are corrected by the studying. Therefore, even when the construction of the system is changed, the system can cope with such change.

BRIEF DESCRIPTION OF THE DRAWINGS

FIG. 3 is a perspective view of a cooling portion of the system of FIG. 1 for cooling LSI chips;

FIGS. 13 and 14 are views similar to FIG. 1, but showing modified systems, respectively;

DESCRIPTION OF THE PREFERRED EMBODIMENTS OF THE INVENTION

Figure 1:
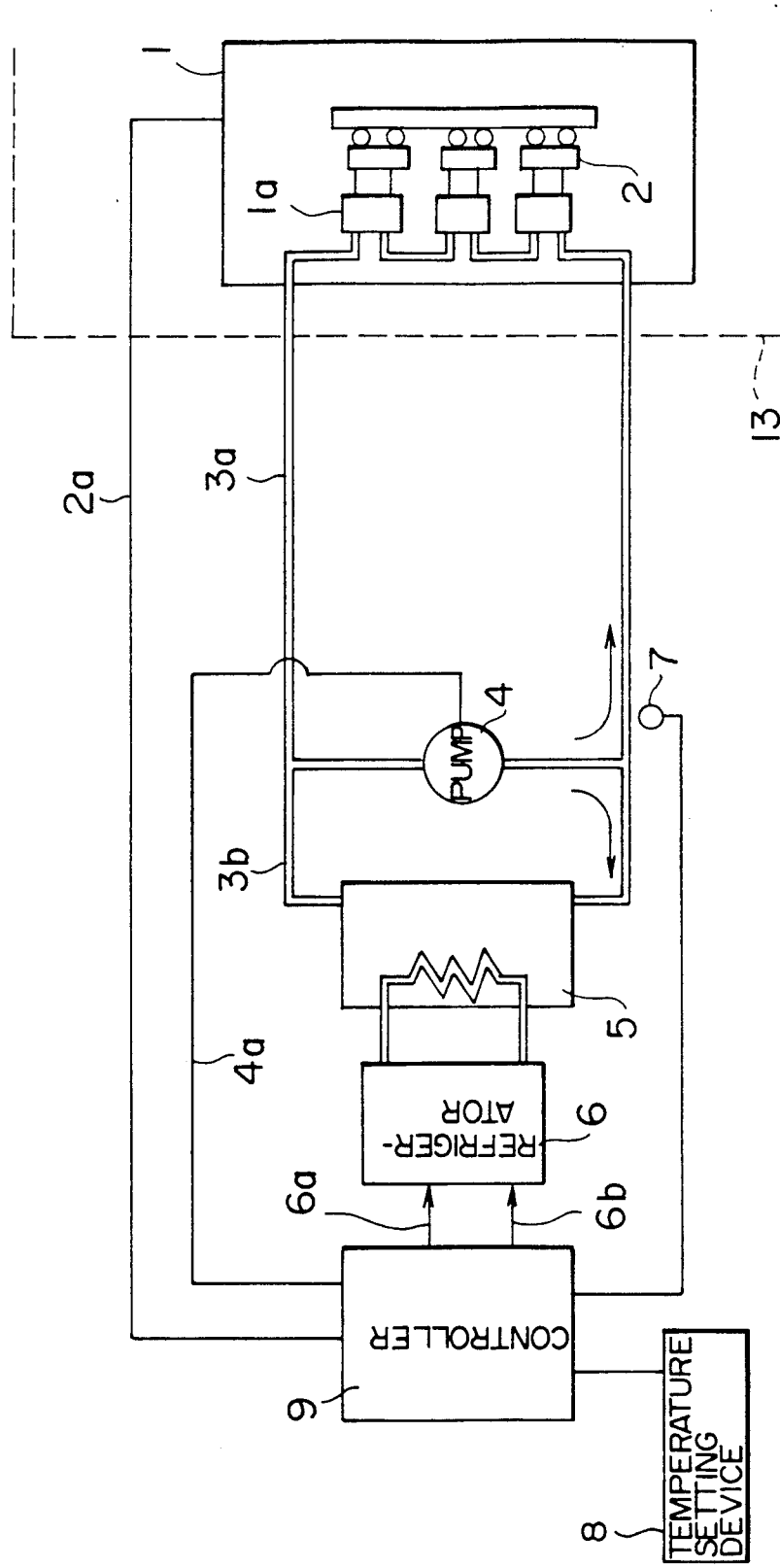
FIG. 1 is a block diagram of a fluid temperature control system according to the invention.

One preferred embodiment of the present invention will now be described with reference to FIGS. 1 to 10. FIGS. 1 to 6 show a fluid temperature control system for cooling LSI chips of a computer. The fluid temperature control system shown in FIG. 1 comprises a heat generating portion 1 in which LSI chips 2 are mounted, with a signal line 2a for feeding a command for starting the operation of the LSI chips 2, and a pump 4 for circulating fluid. A flow path 3a is connected to the pump 4 for feeding the fluid to the heat generating portion 1, heat exchangers 1a, a heat absorbing portion 5 for cooling the fluid, and a flow path 3b is connected to the pump 4 for feeding the fluid to the heat absorbing portion 5, a signal line 4a for feeding a command for starting the operation of the pump 4. A refrigerator 6 is connected to the heat absorbing portion 5 via another heat exchanger, with a signal line 6a feeding an operation-starting command to the refrigerator 6, and a signal line 6b for feeding a command for setting cooling capacity of the refrigerator 6. A sensor 7 is provided upstream of the heat generating portion 1 so as to detect the temperature of the fluid to be supplied to the heat generating portion 1, and a temperature setting device 8 sets the temperature of the fluid, with a controller 9 controlling the overall system.

Figure 2:
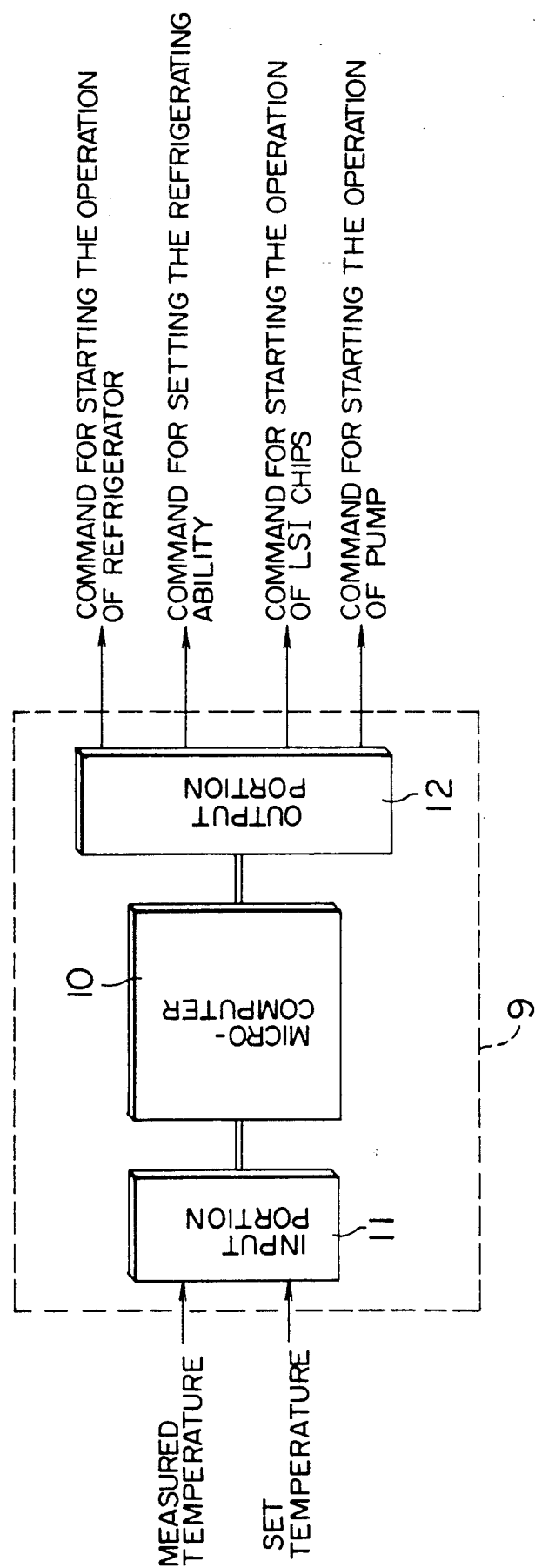
FIG. 2 is a block diagram of a controller of the system of FIG. 1, showing connections of input and output portions of the controller.

FIG. 2 shows connections of input and output portions 11 and 12 of the controller 9. More specifically, the measured value of the temperature of the fluid to be supplied to the heat generating portion 1 and the value of the set temperature are inputted into the input portion 11 which comprises A/D converter, etc. These input values are fed to a microcomputer 10 comprising a memory, a processing unit, etc. In accordance with the result of the calculation, the refrigerator operation-starting command, the set value of the cooling capacity of the refrigerator, the LSI chip operation-starting command, and the pump operation-starting command are outputted via the output portion 12 comprising a buffer circuit, etc.

FIG. 3 shows a cooling portion for the LSI chip 2. The LSI chip 2 on a board 15 is in contact with a fluid flow path 17 through a thermal conductor 16, thereby cooling the LSI chip 2. Thus, the heat generated from the LSI chip 2 is transferred to the fluid through the thermal conductor 16 to thereby cool the LSI chip 2.

Figure 4:
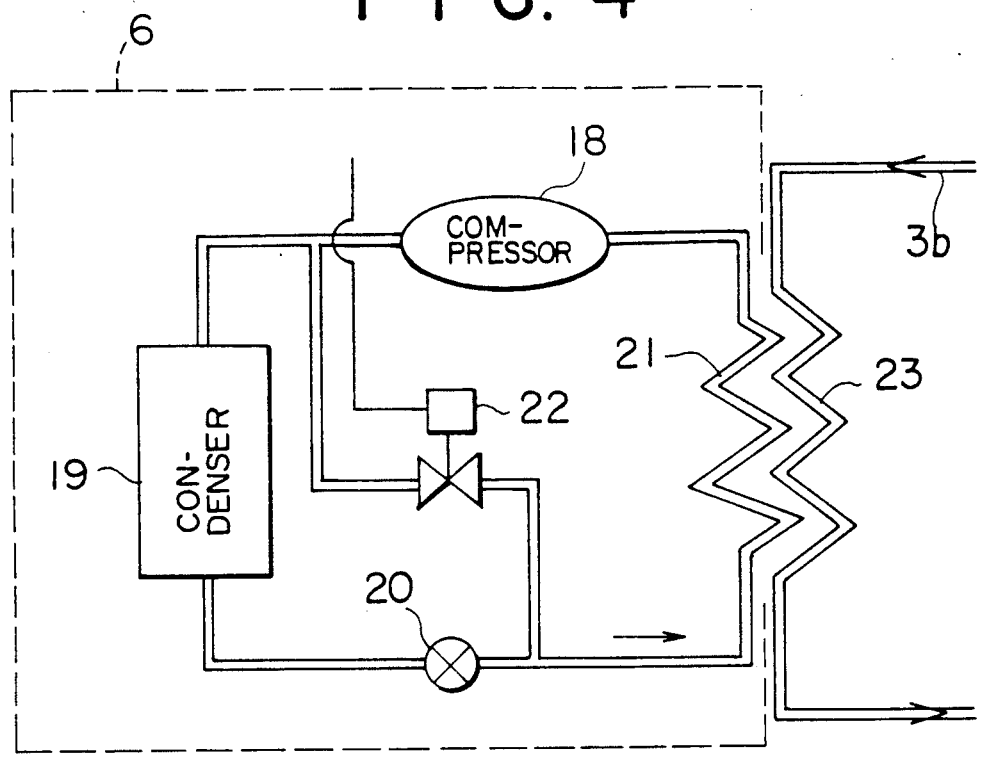
FIG. 4 is a block diagram of a refrigerator of the system of FIG. 1.
Figure 5:
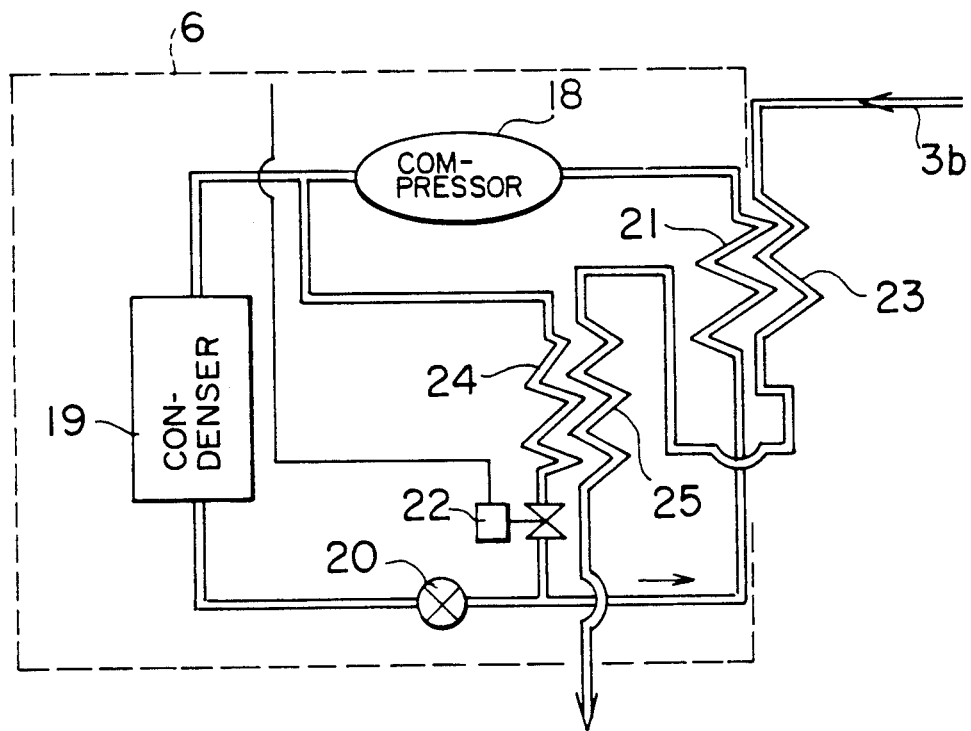
FIGS. 5 and 6 are views similar to FIG. 4, but showing modified refrigerators, respectively.
Figure 6:
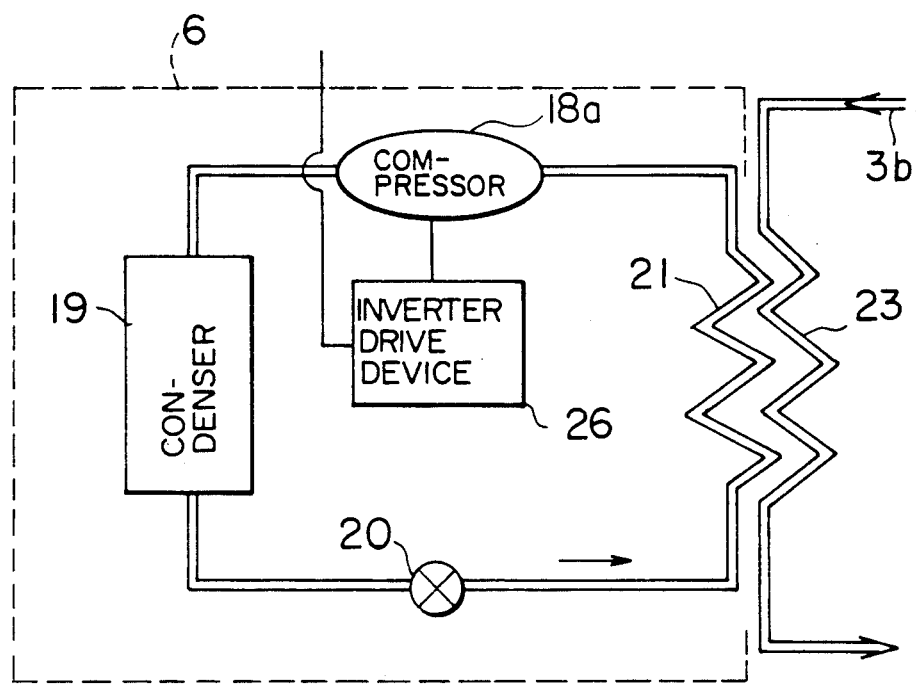

FIGS. 4 to 6 show arrangements by which the cooling capacity of the refrigerator 6 is made to be variable. One example of refrigerator 6 shown in FIG. 4 comprises a compressor 18, a condenser 19, a pressure reducer 20, an evaporator 21, and a refrigerant flow rate control valve 22 of which valve opening degree can be electrically controlled. The refrigerant of high pressure and high temperature discharged from the compressor 18 is air-cooled by a fan (not shown) in the condenser 19, and is reduced in pressure and temperature by the pressure reducer 20. Then, the refrigerant is fed to the evaporator 21, disposed adjacent to a cooler 23 provided in the heat absorbing portion 5, to cool the fluid, and then the refrigerant is returned to the compressor 18. The refrigerant flow rate control valve 22 is provided in a bypass pipe or conduit interconnecting the outlet side of the compressor 18 and the outlet side of the pressure reducer 20. In this refrigerating cycle, by controlling the degree of opening of the refrigerant flow rate control valve 22, the refrigerant of high pressure and high temperature is bypassed to the evaporator 21, so that the temperature of the refrigerant flowing through the evaporator 21 is raised. Therefore, the cooling capacity, that is, the amount of heat exchange between the fluid and the cooler 23, can be varied or reduced.

In another example of refrigerator 6 shown in FIG. 5, two coolers and two condenser are provided. More specifically, the second condenser 24 and the second cooler 25 are arranged adjacent to each other and are provided at the upstream side of a refrigerant flow rate control valve 22 provided in a bypass pipe. In this refrigerating cycle, by controlling the degree of opening of the refrigerant flow rate control valve 22, a part of the refrigerant of high pressure and high temperature flows through the second condenser 24 to be condensed by the second condenser 24. Therefore, the fluid cooled by the cooler 23 is re-heated, so that the amount of heat exchange effected at the heat absorbing portion 5 is varied. In this case, it is also possible to heat the fluid.

In a further example of refrigerator 6 shown in FIG. 6, instead of providing the refrigerant flow rate control valve 22, a compressor 18a having a rotational speed varied by an inverter drive device 26 is provided. In this example, by controlling the rotational speed of the compressor 18a, the amount of circulation of the refrigerant is varied, and therefore the amount of heat exchange effected at the heat absorbing portion 5 is varied.

Usually, water is used as the fluid, but any other suitable fluid may be used.

Figure 7:
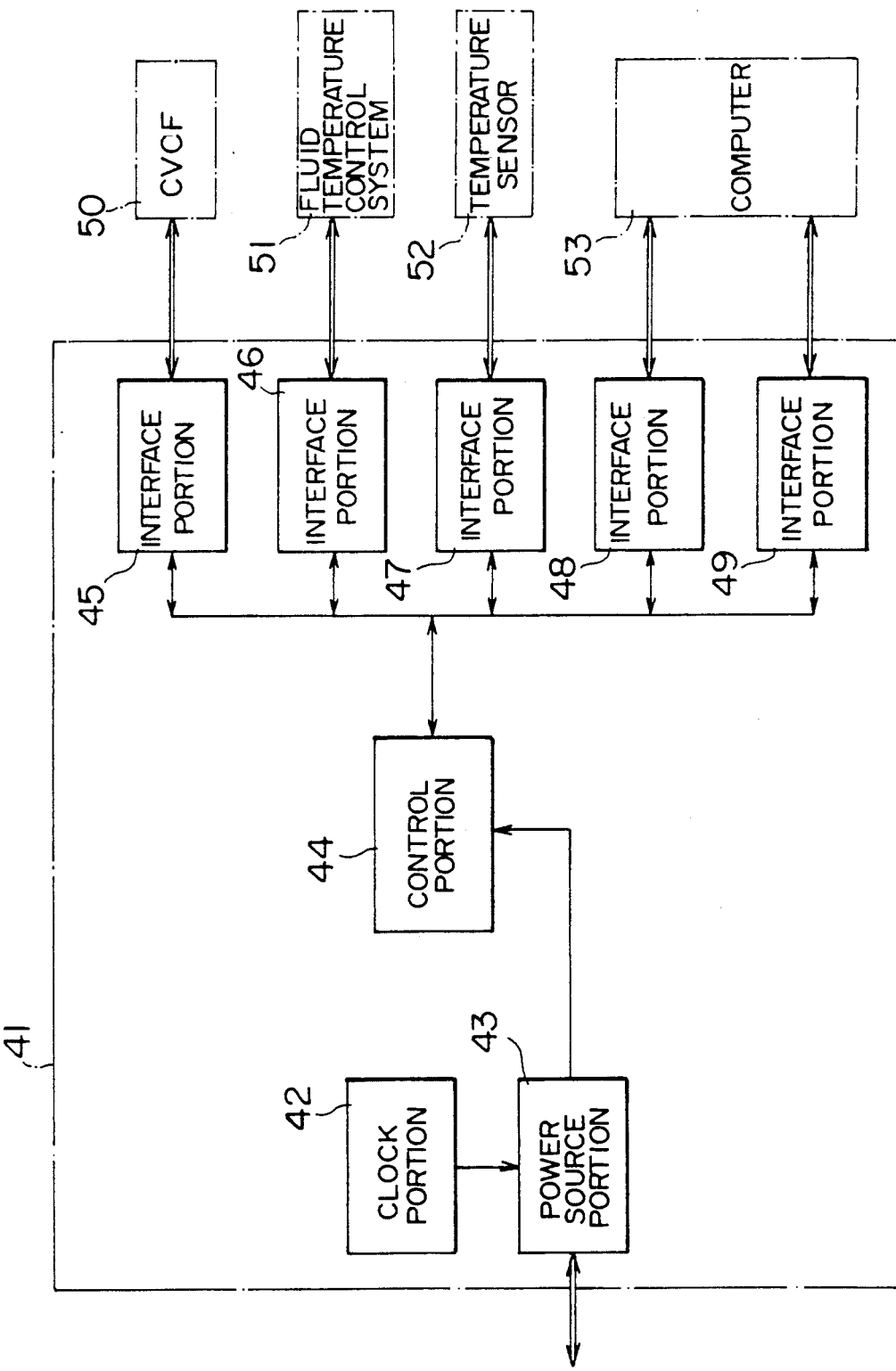
FIG. 7 is a block diagram of a system operating device.

A system operating device 41 for the computer is constructed as shown in FIG. 7. A power source may be turned on manually. However, for example, the system of the type in which the power source is designed to be turned on at a preset time comprises an uninterruptive clock portion 42 for outputting a signal at the preset time, a power source portion 43 operable in response to the output signal from the clock portion 42, a control portion 44 operable when the power voltage rises upon operation of the power source portion 43, and interface portions 45 to 49 for the computer and associated devices.

The interface portion 45 is a CVCF interface portion for controlling a CVCF (constant-voltage/constant-frequency power source) 50. The interface portion 46 is a fluid temperature control system interface portion for controlling the start of the operation of the fluid temperature control system 51 (or cooling system). The interface portion 47 is a temperature detecting interface portion for receiving a signal from the sensor 7 for detecting the temperature of the fluid in the fluid temperature control system 52. The interface portion 48 is a power source control portion for controlling the power source of the computer 53. The interface portion 49 is starting control portion 49 for controlling a program loading and other startings. The clock portion 42 is always in an operative condition, and outputs a signal at the present operating time of this device (that is, at tee computer starting time), thereby operating the power source portion 43 to turn on the power source of this device. When the power source is turned on, the control portion 44 begins to operate, and feeds to the CVCF interface portion 45 a signal for starting the operation of the CVCF 50. The CVCF interface portion 45 outputs a CVCF operation-starting signal to the CVCF 50. The CVCF interface portion 45, when receiving a signal indicating that the operation of the CVCF 50 becomes steady, passes this signal to the control portion 44. If the temperature condition is within a predetermined range, the control portion 44 begins to control the computer 53. First, the control portion 44 feeds a command for turning on power sources for the devices constituting the computer system to the power source control portion 48. The power source control portion 48 effects the ON-control of the power source of the computer system 53, and this portion 48, when receiving a power ON-completion signal, passes this signal to the control portion 44. The control portion 44, when receiving this signal from the power source control portion 48, feeds to the system starting control portion 49 an instruction for controlling the program loading and the start of the operation of a central processing unit. The control portion 44, when receiving from the system starting control portion 49 information that the computer system 53 starts to operate, stops the sequential control operations.

This computer system operating device 41 is already known in the art, and is disclosed, for example, in Japanese Patent Unexamined Publication No. 56-24622.

Figure 8:
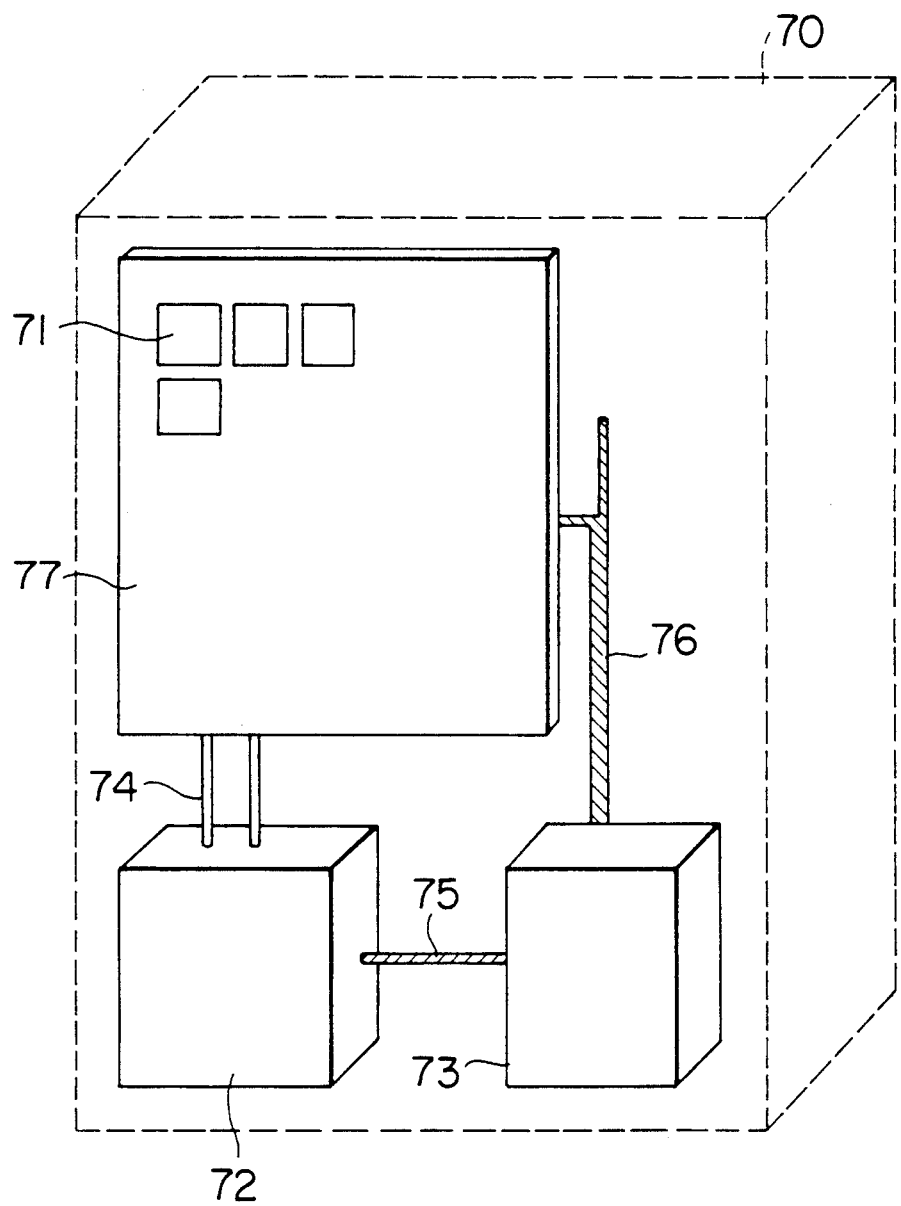
FIG. 8 is a perspective view of a computer system in which a fluid temperature control system of the invention is incorporated.
Figure 9:
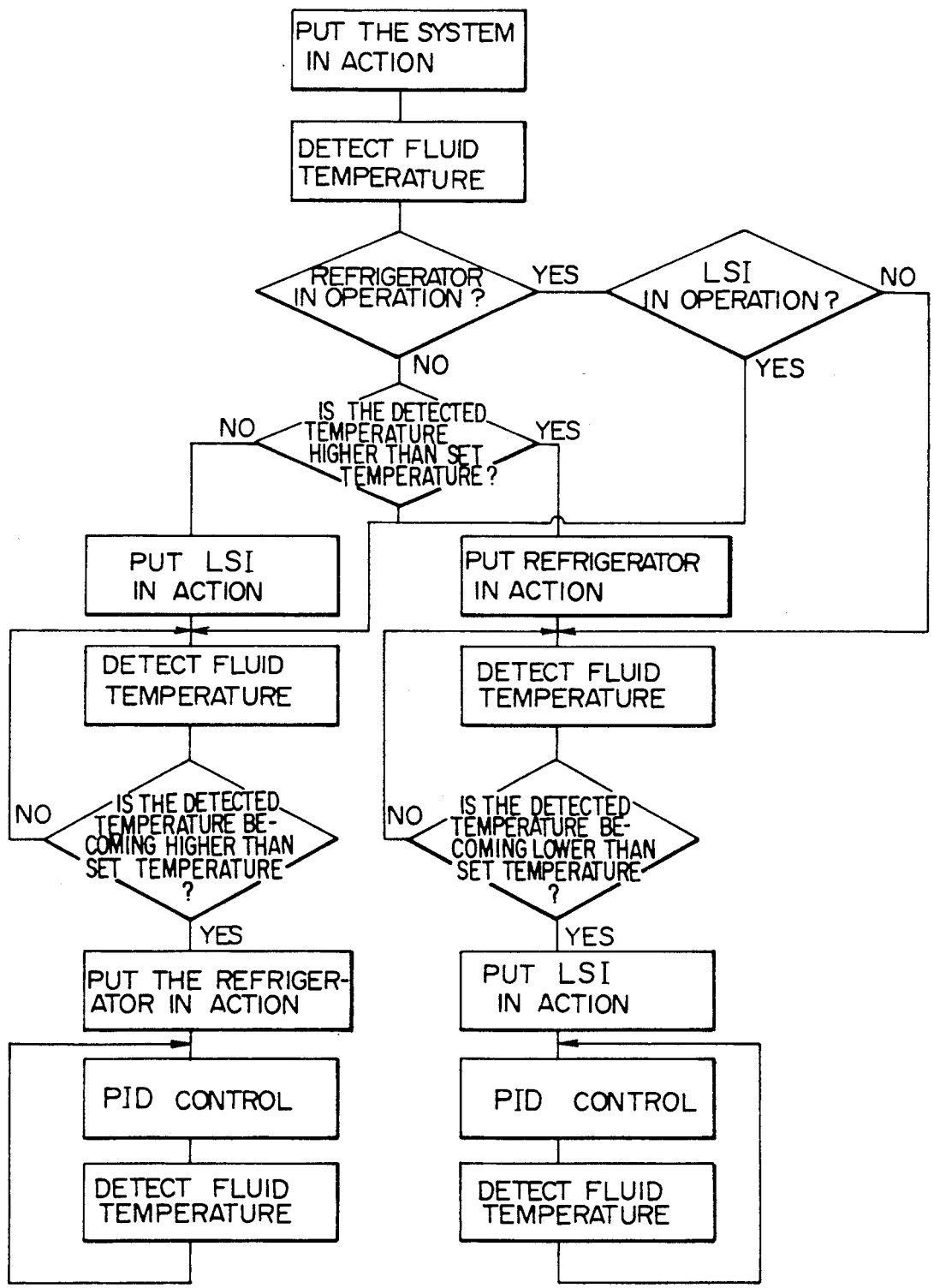
FIG. 9 is a flow chart of a temperature control at the time of starting of the system.

FIG. 8 shows a computer system 70 in which a fluid temperature control system 72 according to the present invention, LSI chips 71 (heat generating bodies), and a system operating device 73 are incorporated. The LSI chips 71 are connected to the fluid temperature control system 72 via conduits 74. The fluid temperature control system 72 is connected to the system operating device 73 by a signal line 75. The system operating device 73 is connected to a computer 77 by wiring 76.

Next, the operation of the above fluid temperature control system constituting one preferred embodiment of the invention, as well as the operation of the computer system, will now be described. Reference is first made to the operation when the above system is started, with reference to a flow chart of FIG. 9.

When the system is started, a pump operation-starting command is fed via the signal line 4a so as to start the pump 4, so that the fluid is circulated through the flow path 3a (disposed on the side of the heat generating portion 1) and the flow path 3b (disposed on the side of the heat absorbing portion 5) as indicated by arrows.

Then, the temperature of the fluid is measured by the sensor 7. With this arrangement, since the fluid is circulated through the flow paths, there is no temperature variation of the fluid in these flow paths. Therefore, the average fluid temperature can be measured by the sensor 7 regardless of the position of sensing of the fluid temperature.

Then, it is confirmed whether or not the refrigerator 6 is in an operative condition. If the refrigerator 6 is not operated (i.e., in an inoperative condition), the measured temperature is compared with the set temperature. And, if the measured temperature is higher, the following control (a) is carried out. On the other hand, if the measured temperature is lower, the following control (b) is carried out.

(a) The operation of the refrigerator 6 is started in accordance with the refrigerator operation-starting command. Then, it is judged at predetermined time intervals whether or not the measured temperature of the fluid is lower than the set temperature, and when the measured temperature is going to be lower, than the signal for starting the operation of the LSI chips 2 is fed.

(b) The signal for starting the operation of the LSI chips 2 is fed, and it is judged at predetermined time intervals whether or not the measured temperature of the fluid is higher than the set temperature. And, when the measured temperature is going to be higher, then the operation of the refrigerator 6 is started in accordance with the refrigerator operation-starting command.

If the refrigerator 6 is in an operative condition, the following procedures (a') and (b') are performed: (a') If the LSI chips 2 are in their inoperative condition, the signal for operating the LSI chips 2 is fed when the temperature of the fluid is going to be below the set temperature. (b') If the LSI chips 2 are in their operative condition, the operation of the refrigerator 6 is continued, and a PID (proportional plus integral plus differential) control mentioned below is effected in accordance with the fluid temperature measured at predetermined time intervals.

The temperature of the fluid can be rapidly brought into the set temperature by the above system starting.

Thereafter, in order to keep the fluid temperature at the set temperature, the above PID control is effected by the refrigerator 6 having a variable cooling capacity. The value of the set temperature from the temperature setting device and the value of the fluid temperature measured by the sensor 7 at each predetermined sampling time are inputted into the controller 9 shown in FIG. 2. The calculation of the difference e between the fluid temperature value and the set temperature value, as well as calculations of the following formulas (i) to (iv), is effected by the calculating portion of the microcomputer 10, and the calculation result Y is outputted.

Proportional operation: $Yp = Kp \cdot e$      (i)

Integral operation: $Yi = Ki \cdot \int e \, dt$      (ii)

Differential operation: $Yd = Kd \cdot de/dt$      (iii)

Calculation result: $Y = Yp + Yi + Yd$      (iv)

where Kp, Ki and Kd represent constants of proportionality, and t represents time.

Figure 10:
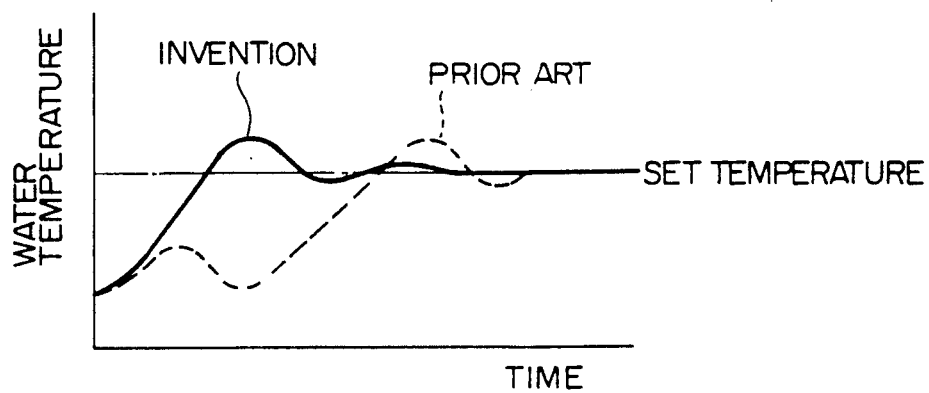
FIGS. 10 and 11 are diagrammatical illustrations showing fluid temperature variations at the time of starting of the system of the invention.
Figure 11:
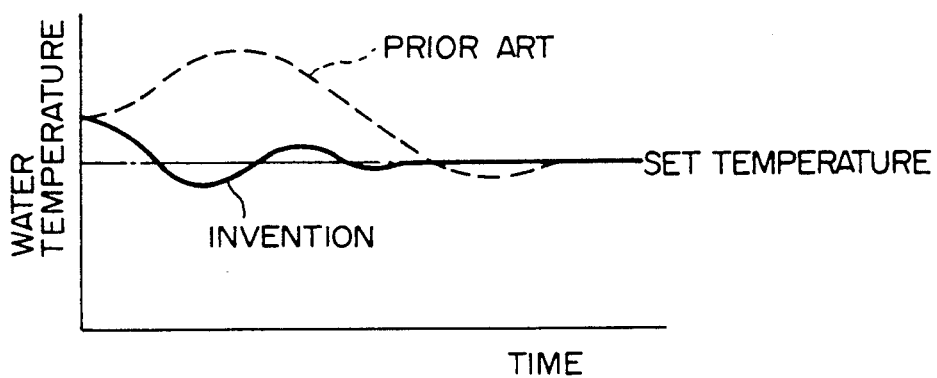
Figure 12:
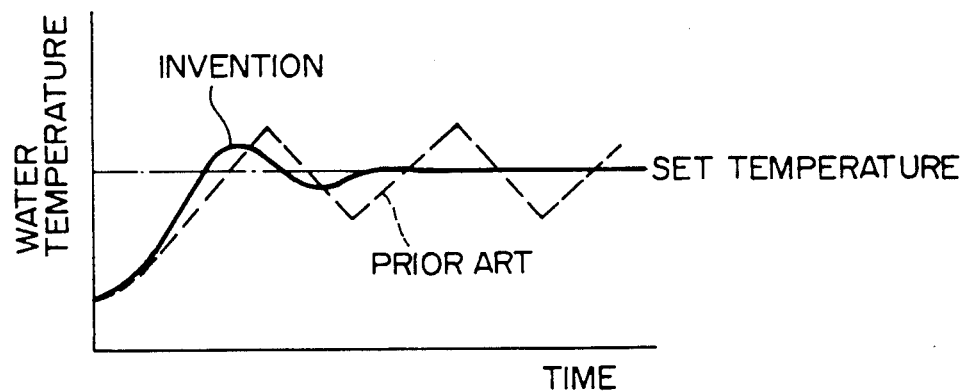
FIG. 12 is a diagrammatical illustration showing fluid temperature variations at the time of PID control of the system of the invention.

The calculation result is outputted via the output portion 12 as the cooling capacity-setting signal (that is, a signal representative of the opening degree of the refrigerant flow rate control valve 22 in the case of the refrigerators of FIGS. 4 and 5, and a signal representative of the operation frequency of the compressor 18a in the case of the refrigerator of FIG. 6). When the refrigerator 6 is operated, the cooler 23, disposed adjacent to the evaporator 21, is cooled indirectly, and as a result the fluid is cooled. In the condenser 19, warm air is blown out of the system by the fan (not shown). The fluid, circulated by the pump 4 to the cooling portion for the LSI chips 2, carries the heat generated from the LSI chips 2 and thermally transferred to the fluid via the thermal conductor 16, thereby cooling the LSI chips 2. Because of the above PID control, by suitably determining or setting the above constants, the fluid temperature can be controlled in such a manner that the difference between the fluid temperature and the set temperature is small and that the temperature variation is small. The temperature variations obtained with the above system starting method using water as the fluid are shown in FIGS. 10 and 11, and the temperature variation obtained with the PID control is shown in FIG. 12 shows a case where the fluid temperature at the time of starting the system is lower than the set temperature, and the time required for the required temperature to reach the set temperature is markedly reduced as compared with the temperature rise characteristics (indicated by a broken line in FIG. 10) obtained when the operation of the refrigerator 6 and the operation of the LSI chips 2 are started simultaneously. Namely, when the two operations are started simultaneously, a certain rise time is required until the cooling capacity is extracted fully (i.e., up to 100%) and the time for the temperature rise of the LSI chips 2 is earlier, so that the fluid temperature once rises. Soon the cooling capacity of the refrigerator 6 becomes greater than the amount of the heat generated from the LSI chips 2 and the fluid temperature is lowered. Thereafter, the fluid temperature approaches the set fluid temperature. Accordingly, much time is required until the fluid temperature is controlled to the set temperature. In this embodiment, good characteristics shown in FIG. 10 can be obtained, since the refrigerator is not operated until the fluid temperature exceeds the set temperature after starting of the system.

FIG. 11 shows a case where the fluid temperature at the time of starting the system is higher than the set temperature. In this case, also, the time required for the fluid temperature to reach the set temperature is markedly reduced as compared with the temperature fall characteristics (indicated by a broken line in FIG. 11) obtained when the operation of the refrigerator 6 and the operation of the LSI chips 2 are started simultaneously. Namely, when the two operations are simultaneously started, a certain rise time is required until the cooling capacity is extracted fully (i.e., up to 100%), as described above and the amount of the heat generated from the LSI chips 2 is greater than the cooling amount, so that the fluid temperature once rises. Soon the cooling capacity of the refrigerator 6 becomes greater than the amount of the heat generated from the LSI chips 2 and the fluid temperature is lowered. Thereafter, the fluid temperature approaches the set temperature. Accordingly, much time is required until the fluid temperature is controlled to the set temperature. In contrast, in this embodiment, the LSI chips 2 are not operated until the fluid temperature reaches the set temperature, and therefore the fluid temperature can be controlled to the set temperature in a short time.

One method of effecting the fluid temperature rise and fall in a shorter time is to warm up the refrigerator by a heater. For example, if the compressor is warmed up, the start-up (starting) characteristics for the refrigerator can be markedly improved.

In the case where the fluid temperature control system is designed to automatically start its operation as a preset time, better advantageous effects can be obtained by preoperating the refrigerator before the preset time of starting the system.

FIG. 12 shows the result obtained when the fluid temperature is controlled to the set temperature by the PID control. In a conventional method, since ON-OFF operation of the refrigerator are repeated, the fluid temperature greatly fluctuates up and down with respect to the set temperature as indicated by a broken line. In this embodiment, since the cooling capacity of the refrigerator is controlled by the PID control as described above, the fluid temperature can be controlled in such a manner that the deviation thereof from the set temperature as well as the temperature fluctuation is kept to a small level.

The above set temperature is in the range of between 20° C. and 30° C., and better results are obtained when the set temperature is 28° C.

In the above embodiment, the timing of starting the operation of the refrigerator 6 as well as the timing of starting the operation of the LSI chips 2 is determined by judging or predicting whether the detected temperature of the fluid is going to be higher or lower with respect to the set temperature. However, the operating timing may be determined by a differential value (for example, the set temperature $\pm 1° \sim 2°$ C.). In FIG. 10, the timing of starting the operation of the refrigerator 6 may be determined by the set temperature $+2°$ C., and in FIG. 11, the timing of starting the operation of the LSI chips 2 may be determined by the set temperature −2° C.

Another method of controlling the fluid temperature at the time of starting the system is to control the pump 4. At the time of starting the system, the pump 4 and the refrigerator 6 are simultaneously started. As described above, (a'') if the average fluid temperature is higher than the set temperature, the operation of the LSI chips 2 is started when the fluid temperature is going to be lower than the set temperature. (b'') If the average fluid temperature is lower than the set temperature, the pump 4 is once stopped, and the operation of the LSI chips 2 is started, and thereafter the pump 4 is started again when the fluid temperature is going to be higher than the set temperature.

By effecting the above control, it is possible to make the fluid temperature reach the set temperature in a short time.

The computer system 70 (FIG. 8) in which the above fluid temperature control system 72 is incorporated will now be described. Here, for example, the system operating device 73 is designed to be automatically started at a preset time. In this case, since the time of starting the system operating device 73 is preset, the fluid temperature control system 72 can be pre-operated before the preset time. Therefore, start-up (starting) characteristic of the refrigerator 6 is markedly improved, and the refrigerator can perform 100% of its cooling capacity immediately after its starting. When the system operating device 73 is started, the power source portion 43 is operated. Then, when the preparation for the operation of the constant-voltage/constant-frequency power source is completed, the control portion 44 is supplied with the signal indicating that the operation of the constant-voltage/constant-frequency power source is in a steady condition. On the other hand, the fluid temperature control system 72 performs the above-mentioned operation, and sets the fluid temperature at the set temperature within three minutes. At this time, a signal is fed to the control portion 44, and after it is confirmed that this signal and the signal representative of the preparation for the operation of the above power source are both inputted into the control portion 44, the operation of the computer system 70 is started. Thereafter, the refrigerator having the variable cooling capacity is controlled by the PID control, and the temperature control can be effected with a small deviation of the fluid temperature from the set temperature.

Thus, by incorporating the fluid temperature control system of the present invention into the computer system, the fluid temperature can be rapidly set at the set temperature, thereby greatly enhancing the operation efficiency of the computer system. Further, since the deviation of the fluid temperature from the set temperature can be kept to a low level, the stable operation of the computer system can be maintained.

Modified fluid temperature control systems of the invention are shown in FIGS. 13 and 14, respectively. The fluid temperature control system of FIG 13 is generally similar in construction to the fluid temperature control system of FIG. 1, but differs therefrom in that two refrigerators 61 and 62 are connected in parallel with the heat absorbing portion 5. The fluid temperature control system of FIG. 14 is also generally similar to the fluid temperature control system of FIG. 1, but differs therefrom in that two refrigerators 61 and 62 are connected to two heat absorbing portions 55 and 56, respectively. In these embodiments, two refrigerators are employed with both having a variable cooling capacity. Alternatively, one of them may have a variable cooling capacity. In the former case, even if one of the two refrigerators is subjected to malfunction, the other refrigerator can still achieve the intended purpose, thus providing a fail-safe function.

Figure 15:
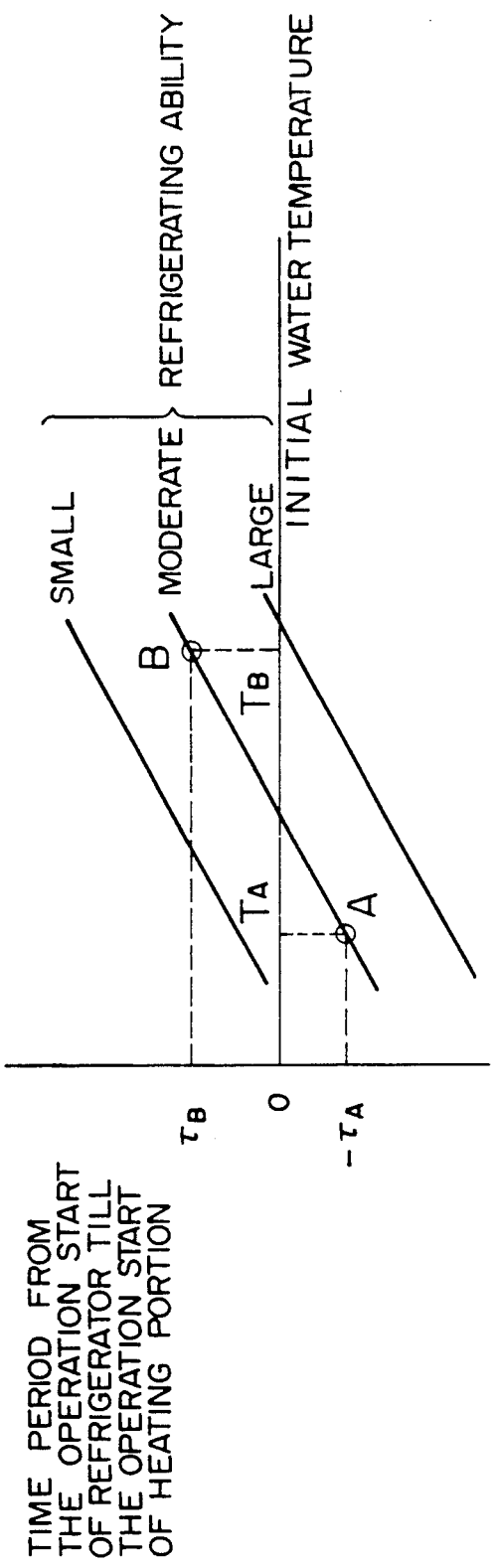
FIG. 15 is an illustration showing a modified temperature control method of the invention.
Figure 16:
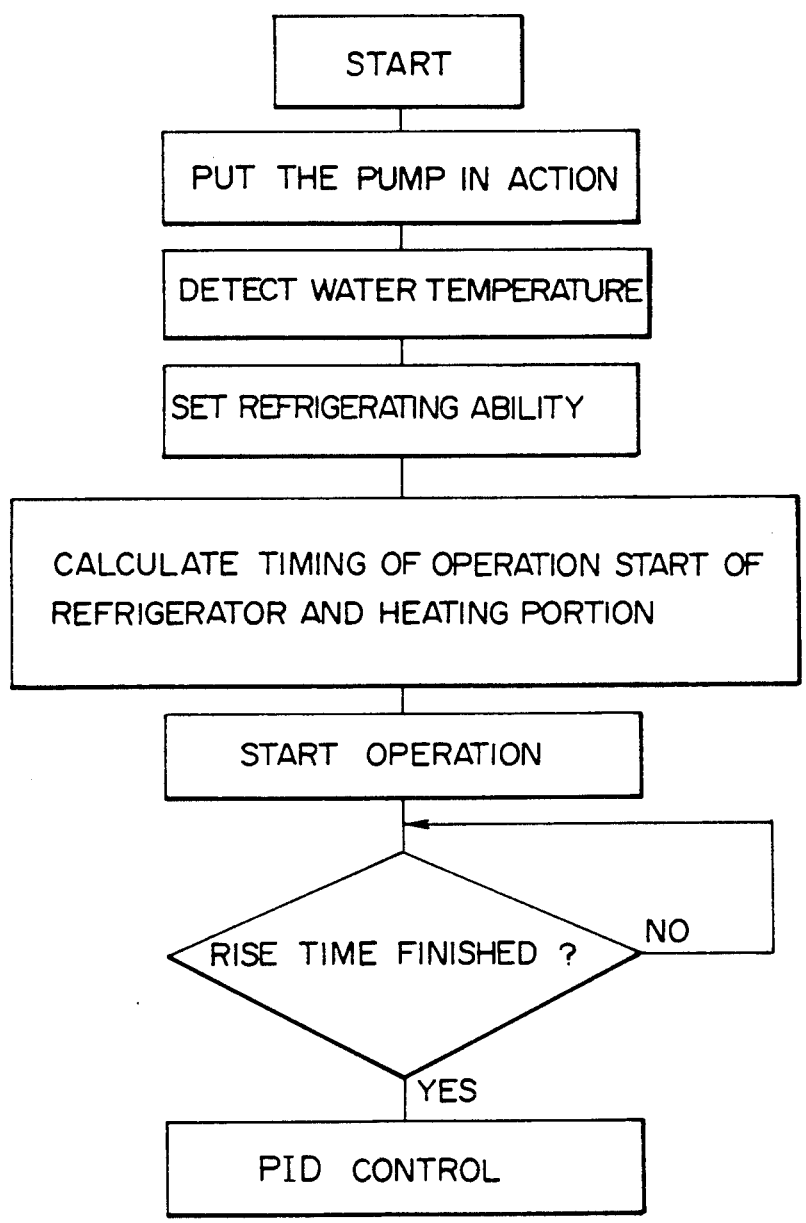
FIG. 16 is a flow chart of the control by the method of FIG. 15.
Figure 17:
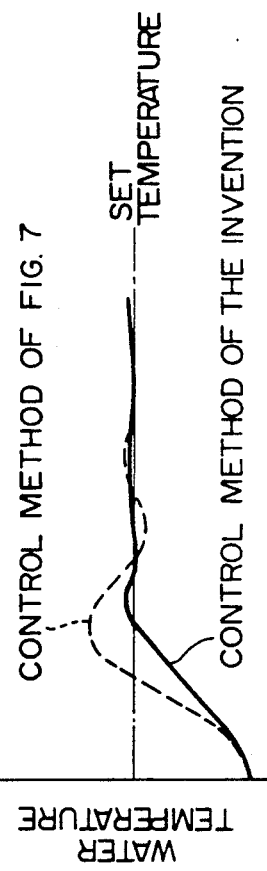
FIG. 17 is a diagrammatical illustration showing fluid temperature variations at the time of starting of the system in the method of FIG. 15.

A modified form of the invention is shown in FIGS. 15 to 17. A fluid temperature control system of this embodiment is identical in construction to the fluid temperature control system shown in FIGS. 1 to 3, and therefore explanation of the construction is omitted here. A feature of this embodiment resides in that the control is effected in such a manner that the cooling capacity of the refrigerator is fixed for a predetermined time period after starting of the refrigerator. Before starting the operation of the refrigerator, the temperatures of all the parts or portions are the same as the ambient temperature. Therefore, after the operation is started, a certain start-up (starting) time is required until the refrigerator performs 100% of its cooling capacity. It is not desirable from the viewpoint of reliability that the cooling capacity of the refrigerator is frequently varied during that time period. In FIG. 15, the cooling capacity of the refrigerator is fixed for a predetermined time period after starting of the refrigerator, and the ordinate represents the time period from starting the operation of the refrigerator until starting the operation of the heat generating portion and the abscissa represents the initial fluid temperature. For example, if the refrigerator 6 has a moderate cooling capacity, it takes a time period $-\tau A$ for the fluid temperature to reach the set temperatures when the initial fluid temperature is TA. Since the value of the time period is negative, it is only necessary to start the operation of the refrigerator after a time period $\tau A$ from starting the operation of the LSI chips 2. When the above initial fluid temperature is TB, it is only necessary to start the operation of the LSI chips 2 after a time period $\tau B$ from starting the operation of the refrigerator (see point B). In addition to the data related to the moderate cooling capacity, data related to large and small cooling capacities are also indicated in FIG. 15. Therefore, such data are prestored in the memory of the microcomputer 10, and the time period during which the refrigerator is to be operated with its cooling capacity fixed, as well as the time at which the operation of the refrigerator is to be started after starting the operation of the LSI chips 2, can be determined by the interpolation to the data. FIG. 16 shows a flow chart for performing this starting method. As described above for the embodiment of FIG. 1, when the system is started, the operation of the pump 4 is first started. Then, the temperature of the fluid is measured, and the cooling capacity is set, and then the above time period $\tau$ is calculated. In accordance with this value, the order of operation of the refrigerator and the LSI chips 2 as well as the timings thereof is determined or set. From the time point when the start-up time terminates, the refrigerator or the refrigerant flow rate control valve is controlled by the PID control as described above for the embodiment of FIG. 1. The result of the temperature control effected by the fluid temperature control system of this embodiment is shown in FIG. 17. In this embodiment, the refrigerator is initially operated for the predetermined time period with its cooling capacity fixed, and therefore, although the rise of the fluid temperature is somewhat delayed, the temperature control of the cooled fluid can be achieved with a small overshoot relative to the set temperature.

For quickening the rise of the fluid temperature, the refrigerator may be warmed up or pre-operated, as described above.

Figure 18:
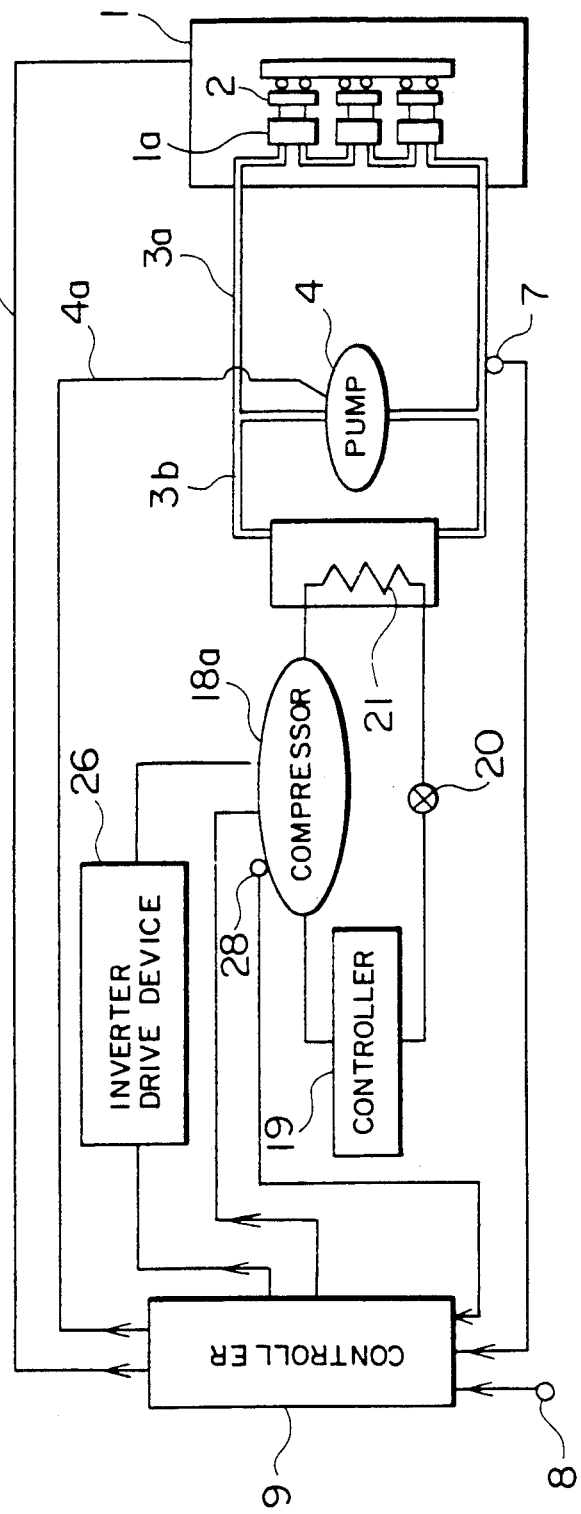
FIG. 18 is a view similar to FIG. 1, but showing a modified system.
Figure 19:
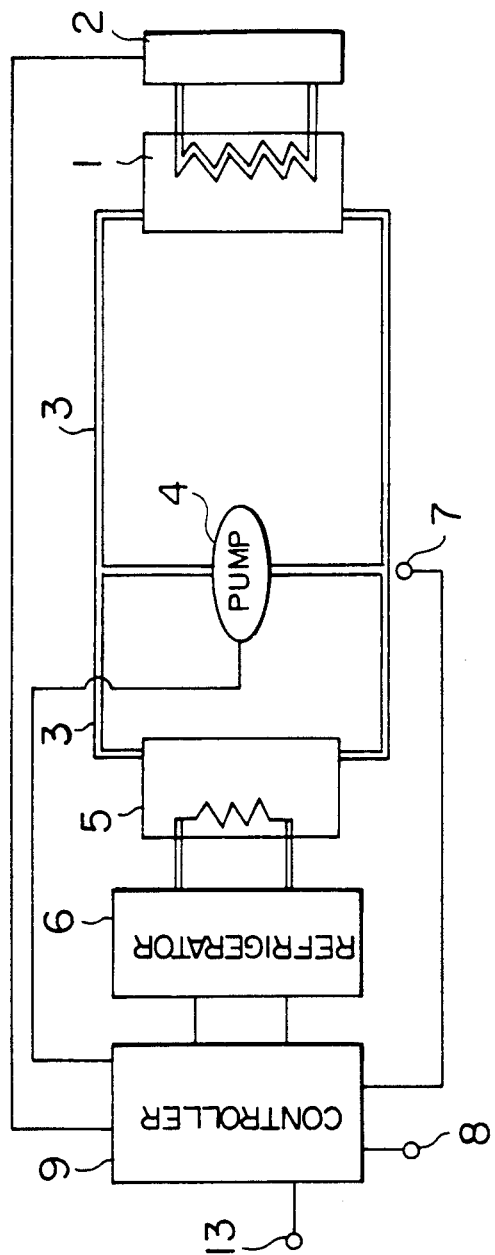
FIG. 19 is a view similar to FIG. 1, but showing a modified system.
Figure 20:
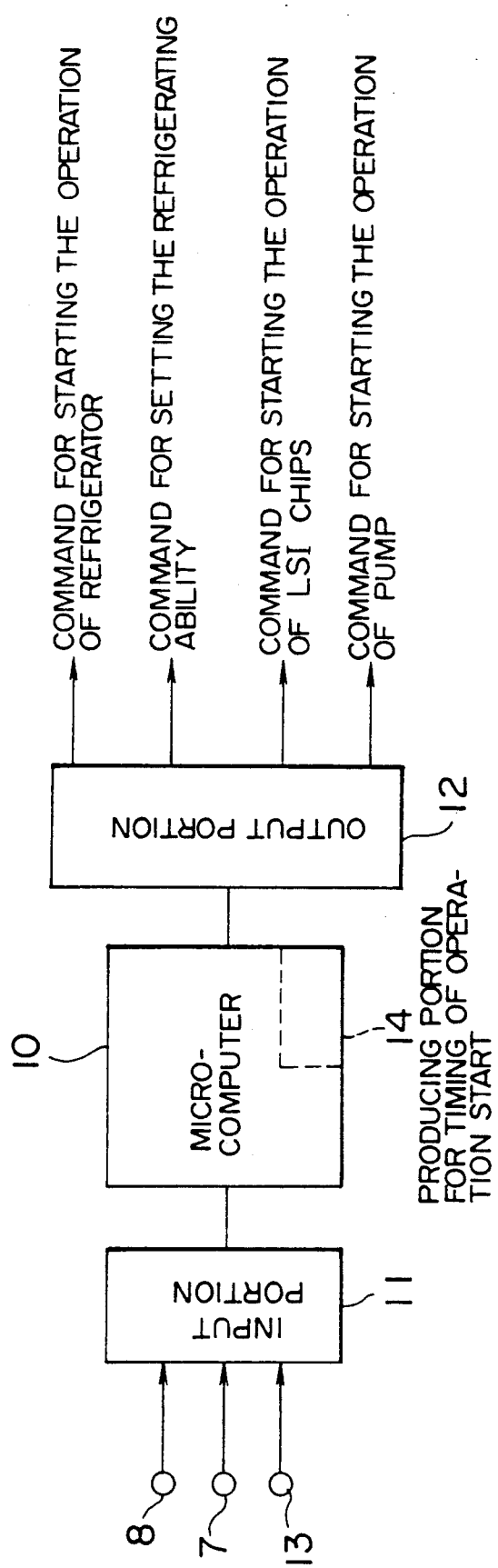
FIG. 20 is a block diagram of a controller of the system of FIG. 19.

The embodiment of FIG. 18 differs from the embodiment of FIG. 1 in that there is provided as sensor 28 for detecting the condition of each portion of the refrigerator. In FIG. 18, as a representative example, the temperature of the chamber of the compressor 18a is detected. After the refrigerator is stopped for a long time, the entire compressor is cooled to a low temperature almost equal to the ambient temperature. As described above, when starting the refrigerator in this condition, a considerable time period is required until the cooling capacity reaches the set level, and even if the cooling capacity is variable in this condition, the desired cooling capacity is not obtained. Therefore, it is different to effect a stable control of the fluid temperature. However, when the refrigerator is again started at a relatively short time period after the operation of the refrigerator is stopped, the refrigerator is generally in its operative condition. Therefore, the cooling capacity can be controlled by the PID control immediately after the starting. By detecting the temperature of the chamber of the compressor 18 by the sensor 28, the condition of the compressor 18 can be judged, and therefore a better fluid temperature control can be carried out. The sensor 28 may be of any type in so far as it can judge whether the refrigerator has been stopped for a long time period or is re-started at a relatively short time period after its stop.

Figure 21:
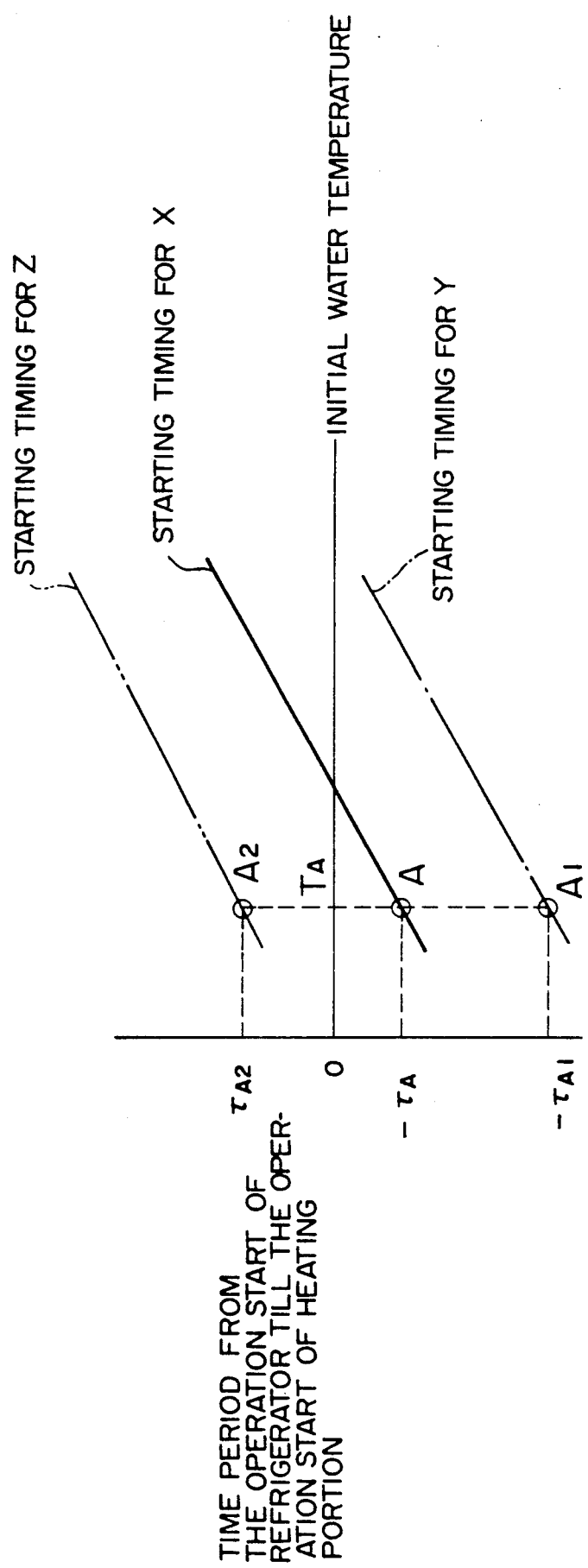
FIGS. 21 and 22 are views illustrative of a modified temperature control method of the invention.
Figure 22:
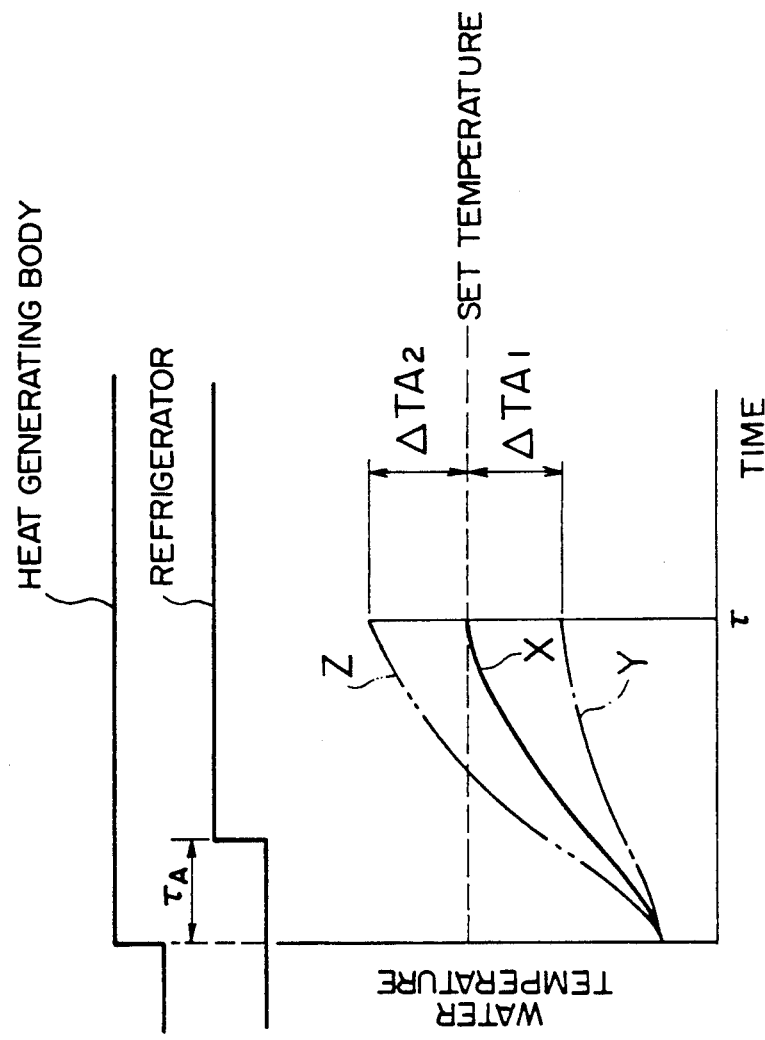
Figure 23:
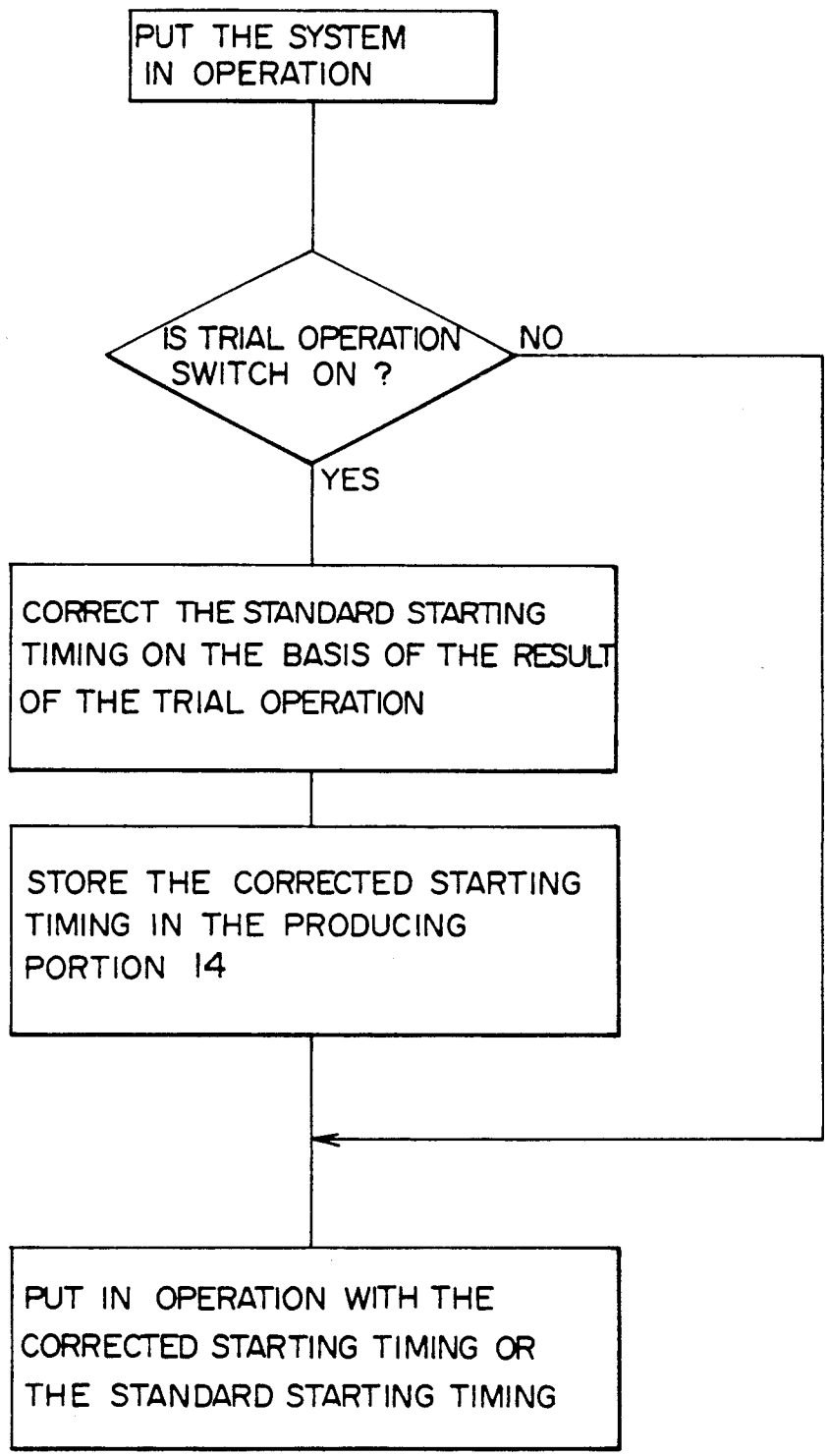
FIG. 23 is a flow chart of the temperature control of FIGS. 21 and 22.

A further modified form of the invention will now be described with reference to FIGS. 19 to 23. A feature of this embodiment resides in that the operating timings of the refrigerator and the LSI chips 2 are corrected by the interpolation based on the data beforehand stored in the memory and also be effecting the learning at the time of a trial operation of the system. The construction of this embodiment is generally similar to that of the embodiment shown in FIG. 1, but differs therefrom in that the controller 9 has a starting timing-producing portion 14 for effecting the learning effect and that a mode selection switch 13 for selecting a trial operation mode is connected to the controller 9 (see FIGS. 19 and 20). In FIG. 21, as is similar to FIG. 15, the cooling capacity of the refrigerator is fixed for a predetermined time period after starting of the refrigerator, and the ordinate represents the time period from starting the operation of the refrigerator till starting the operation of the heat generating portion, and the abscissa represents the initial fluid temperature. A main purpose of this embodiment is to reconstruct the control system by the learning control when the amount of the fluid in the circuit and the amount of the heat generated from the LSI chips 2 are changed as a result of the addition of a part(s) to the fluid temperature control system, or when the total amount of the fluid in the circuit is changed. In FIG. 22, a curve X represents the starting timing when the fluid temperature control system is standard, that is, the amount of the fluid in the circuit as well as the amount of the heat generated from the LSI chips 2 is standard. A curve Y represents the starting timing when, although the amount of generation of the heat from the LSI chips 2 is standard, the total amount of the fluid in the circuit is large. A curve Z represents the starting timing when, although the amount of generation of the heat from the LSI chips 2 is large, the total amount of the fluid in the circuit is standard. When the operations of the refrigerator and the LSI chips 2 are started at the timing indicated by point A in FIG. 21, the fluid temperature can be rapidly controlled to the set temperature if the fluid temperature control system corresponds to the curve X; however, if the system corresponds to the curve Y, the temperature rise of the fluid is retarded as shown in FIG. 22 because of the increased total amount of the fluid in the circuit, so that the fluid temperature does not reach the set temperature after time $\tau$. In contrast, if the system corresponds to the curve Z, the temperature rise of the fluid is quickened as shown in FIG. 22 because of the relatively large amount of the heat generated from the LSI chips 2, so that only with the timing control, the fluid temperature exceeds the set temperature after time $\tau$. Therefore, the timing needs to be modified so that when the system corresponds to the curve Y, the operating timing of the LSI chips 2 is quickened, and when the system corresponds to the curve Z, the operating timing of the LSI chips 2 is delayed. FIG. 23 shows a flow chart for achieving such timing correction. A standard starting timing of the system is incorporated in the starting timing-producing portion 14. The mode selection switch 13 is turned on, and the system is started for a trial operation. In accordance with the result of this operation, the starting timing in the starting timing-producing portion 14 is corrected. More specifically, in the case where the system corresponds to the curve Y, there is a temperature difference $\Delta TA1$ (FIG. 22) between the fluid temperature and the set temperature, and therefore in accordance with this value the standard starting timing is corrected. The corrected starting timing is stored in the memory in the starting timing-producing portion 14. Once the correction is made, the starting timing does not need to be adjusted until the construction of the system is changed.

In this embodiment, although only the starting timing control has been described, another procedure can be used, in which case the fluid temperature is detected, and in accordance with this detected value, the control is switched from the starting timing control to the PID control as in the embodiment of FIG. 1. Further, by detecting the fluid temperature, the starting timing may be learned even during the normal operation.

Figure 24:
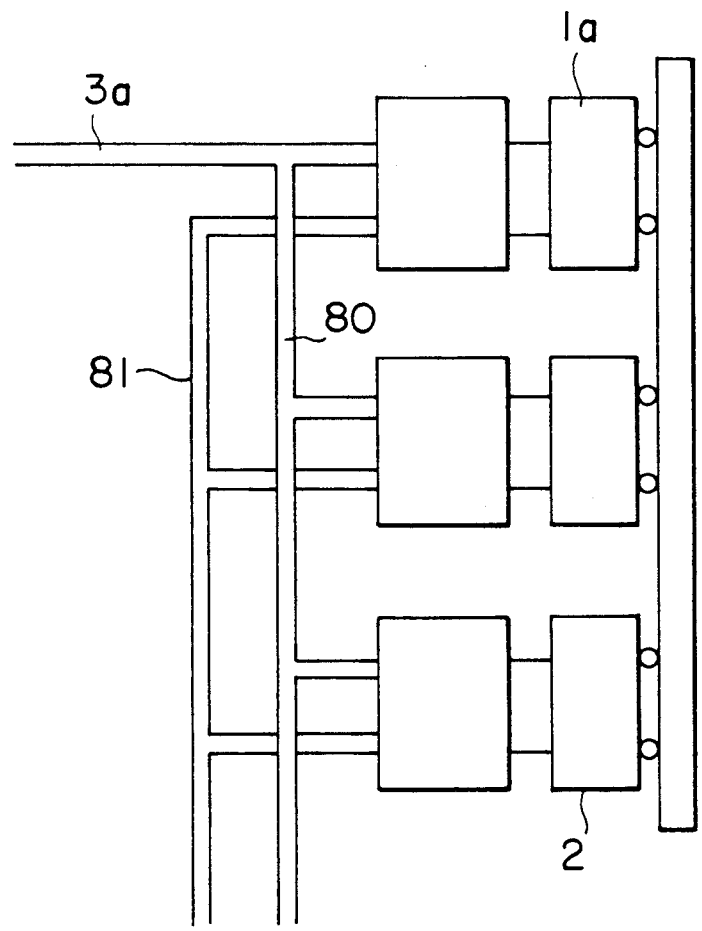
FIG. 24 is a view showing a modified construction of a flow path.

FIG. 24 shows the manner of connection of the flow path 3a for supplying the fluid to the heat generating body or bodies 2 more effectively. In this embodiment, a feed passage 80 of the flow path 3a is branched to feed the fluid to the heat generating members, and after the fluids fed to the branched portions cool the respective heat generating bodies at the heat exchange portions 1a, the fluids join together and flow into a return passage 81 of the flow path 3. With this arrangement, the temperature of the fluid supplied to the heat generating bodies is constant, thereby cooling the heat generating bodies in a more uniform and stable manner.

In the fluid temperature control system according to the present invention, since the pump for circulating the fluid is operated at the time of starting the system, the temperature distribution of the fluid in the flow path becomes small. Therefore, the temperature of the fluid before starting the operation can be accurately measured, and since the timing of starting the operation of the LSI chips as well as the timing of starting the operation of the refrigerator is controlled in accordance with the comparison between the above measured fluid temperature and the set temperature, the fluid temperature can advantageously be rapidly controlled to the set temperature. In the case where the refrigerator is pre-operated, the start-up (starting) of the refrigerator is quickened, and therefore the control can advantageously be effected more rapidly.

Further, in the fluid temperature control system according to the present invention, the cooling capacity of the refrigerator is continuously variable, and the cooling capacity is controlled by the PID (proportional plus integral plus differential) control in accordance with the fluid temperature measured at the predetermined time intervals, so that the fluid temperature can be brought into the set temperature. Also, since the constants are suitably determined, the fluid temperature can advantageously be controlled with small error and deviation relative to the set temperature.

Further, in the fluid temperature control system according to the present invention, the outlet side of the compressor and the outlet side of the pressure reducer are connected together by the bypass pipe. The refrigerant flow rate control valve is provided in the bypass pipe. Alternatively, the inverter-drive compressor is incorporated in the refrigerator. Therefore, the cooling capacity can be controlled over a wide range, and advantageously the frequency of start and stop of the refrigerator can advantageously be reduced.

Further, in the fluid temperature control system according to the present invention, the timing of starting the operation of the LSI chips as well as the timing of starting the operation of the refrigerator is corrected or amended through the learning. Therefore, advantageously, even if the construction of the system is changed, the system can be operated suitably.

What is claimed:

1. A fluid temperature control system comprising
   a flow path for circulating fluid to a heat generating portion,
   means for feeding the fluid,
   means for measuring the temperature of the fluid,
   a refrigerator for cooling the fluid,
   means for measuring the temperature of the fluid at the time of starting of said system, and for comparing said measured fluid temperature with a set temperature, and for controlling the start of the operation of said refrigerator in accordance with result of said comparison, and
   means for starting the operation of said heat generating portion after the fluid temperature reaches said set temperature.

2. A system according to claim 1, in which the cooling capacity of said refrigerator is variable; after the fluid temperature reaches said set temperature, said cooling capacity being controlled by PID control in accordance with the fluid temperature measured at predetermined time intervals.

3. A system according to claim 2, in which said heat generating portion comprises a plurality of heat generating bodies, a feed passage of said flow path is branched to provide branched portions for feeding the fluid respectively to a plurality of separate groups of said heat generating bodies, and the fluid passing past said plurality of groups of heat generating members are joined together at a return passage of said flow path.

4. A system according to claim 2, in which said refrigerator having a variable cooling capacity is constituted by a variable-speed compressor, a condenser, a pressure reducer, and an evaporator.

5. A system according to claim 1, in which said refrigerator is warmed up.

6. A system according to claim 1, in which the timing of starting the operation of said heat generating portion and the timing of starting the operation of said refrigerator are controlled, using a differential value of said set temperature as a trigger.

7. A fluid temperature control system comprising a flow path for circulating a fluid to a heat generating portion, means for feeding the fluid, means for measuring the temperature of the fluid, and a refrigerator for cooling the fluid, wherein the average temperature of the fluid at the time of starting of said system is measured; said average fluid temperature is compared with a set temperature; if said average fluid temperature is higher than said set temperature, the operation of said heat generating portion is started before the fluid temperature reaches said set temperature after the start of the operation of said refrigerator; and if said average fluid temperature is lower than said set temperature, the operation of said refrigerator is started before the fluid temperature reaches said set temperature after the start of the operation of said heat generating portion.

8. A fluid temperature control system comprising a flow path for circulating a fluid to a heat generating portion, means for feeding the fluid, means for measuring the temperature of the fluid, and a refrigerator for cooling the fluid, wherein the average temperature of the fluid at the time of starting of said system is measured; a time difference between the timing of starting the operation of said heat generating portion and the timing of starting the operation of said refrigerator is calculated from said average fluid temperature and a set cooling capacity of said refrigerator; and said timings are controlled in accordance with said calculated time difference.

9. A system according to claim 8, in which if said calculated time difference is positive value, the operation of said heat generating portion is started upon lapse of a time period, equal to said time difference, from the start of the operation of said refrigerator; if said difference is negative value, the operation of said refrigerator being started upon lapse of a time period, equal to said time difference, from the start of the operation of said heat generating portion.

10. A fluid temperature control system comprising a flow path for circulating a fluid to a heat generating portion, a pump providing in said flow path, means for measuring the temperature of the fluid, and a refrigerator for cooling the fluid, wherein said refrigerator and said pump are operated at the time of starting of said system; the temperature of the fluid is measured after the fluid is circulated through said flow path; said measured fluid temperature is compared with a set temperature; if the fluid temperature is higher than said set temperature, the operation of said heat generating portion is started before the fluid temperature reaches said set temperature, and if the fluid temperature is lower than said set temperature, the operation of said pump is stopped, and the operation of said pump is started again before the fluid temperature reaches said set temperature after the start of the operation of said heat generating portion.

11. A system according to claim 10, in which when the fluid temperature reaches said set temperature, the flow rate of said pump is controlled by PID control in accordance with the fluid temperature measured at predetermined time intervals.

12. A fluid temperature control system comprising a flow path for circulating a fluid to a heat generating portion, means for feeding the fluid, means for measuring the temperature of the fluid, and a refrigerator for cooling the fluid, wherein said heat generating portion comprises a plurality of heat generating bodies; a feed passage of said flow path is branched to provide branched portions for feeding the fluid respectively to separate groups of said heat generating bodies, and the fluids passing past said plurality of groups of heat generating bodies are joined together at a return passage of said flow path; a flow rate control valve is provided in said branched portion; the operation of said refrigerator and the measurement of the average temperature of the fluid are effected at the time of starting of said system; said average fluid temperature is compared with a set temperature; if the average fluid temperature is higher than said set temperature, said flow rate control valve is opened, and the operation of said heat generating portion is started when the fluid temperature reaches said set temperature; and if the fluid temperature is lower than said set temperature, said flow control valve is closed, and the operation of said heat generating portion is started, and said flow rate control valve is opened when the fluid temperature reaches said set temperature.

13. A system according to claim 12, in which when the fluid temperature reaches said set temperature, the degree of opening of said flow rate control valve is controlled by PID control in accordance with the fluid temperature measured at predetermined time intervals.

14. A fluid temperature control system comprising a flow path for circulating a fluid to a heat generating portion, means for feeding the fluid, means for measuring the temperature of the fluid, and a refrigerator for cooling the fluid, wherein said heat generating portion comprises a high-speed calculating computer constituted by LSI chips; the average fluid temperature immediately before starting of said system is measured; and the and the timing of starting the operation of said refrigerator are controlled in accordance with comparison between the average fluid temperature and a set temperature, so that the fluid temperature is controlled to said set temperature within 3 minutes.

15. A fluid temperature control system comprising a flow path for circulating a fluid to a heat generating portion, means for feeding the fluid, means for measuring the temperature of the fluid, and a refrigerator for cooling the fluid, wherein constants for control of the timing of starting the operation of said heat generating portion and the timing of starting the operation of said refrigerator are learnt from the average fluid temperature at the time of starting of said system and a time period required for the fluid temperature to reach a set temperature, thereby correcting said control constants.

16. A fluid temperature control system comprising a flow path for circulating a fluid to a heat generating portion, means for feeding the fluid, means for measuring the temperature of the fluid, and a refrigerator for cooling the fluid, wherein from a time period of stop of said refrigerator, it is judged whether the timing of starting the operation of said heat generating portion and the timing of starting the operation of said refrigerator are controlled in accordance with a comparison between the measured fluid temperature and a set temperature or a PID control is effected at the starting of the system, thereby controlling the fluid temperature.

17. A fluid temperature control system comprising a flow path for circulating a fluid to a heat generating portion, means for feeding the fluid, means for measuring the temperature of the fluid, and a refrigerator for cooling the fluid, wherein said system is automatically started at a preset time; said refrigerator is pre-operated before said preset time; the average fluid temperature is measured after starting of said system; and in accordance with a comparison between said average fluid temperature and a set temperature, the timing of starting the operation of said heat generating portion and the timing of re-starting said refrigerator are controlled, so that the fluid temperature can reach said set temperature within 3 minutes.

18. A fluid temperature control system comprising a flow path for circulating a fluid to a heat generating portion, means for feeding the fluid, means for measuring the temperature of the fluid, and a refrigerator for cooling the fluid, wherein the cooling capacity of said refrigerator is variable; said system is automatically started at a preset time; said refrigerator is pre-operated before said preset time; the start of the operation of said heat generating portion and the re-starting of said refrigerator are effected after starting said system; and in accordance with the measured fluid temperature and a set temperature, said cooling capacity of said refrigerator is controlled by a PID control.

19. A method of controlling a fluid temperature in a fluid temperature control system comprising a flow path for circulating a fluid to a heat generating portion, means for feeding the fluid, means for measuring the temperature of the fluid, and a refrigerator for cooling the fluid, said method comprising the steps of:
measuring the average fluid temperature;
controlling the timing of starting the operation of said heat generating portion and the timing of starting the operation of said refrigerator in accordance with a comparison between said average fluid temperature and a set temperature, so that the fluid temperature can reach said set temperature; and
controlling a cooling capacity of said refrigerator by a PID control in accordance with the fluid temperature measured at predetermined time intervals, thereby controlling the fluid temperature.

20. A computer system comprising a computer, a cooling system for cooling LSI chips of said computer by a fluid, and a system operating device for controlling the operations of said computer and said cooling system via an interface circuit, wherein the temperature of the fluid is measured by said system operating device before starting of said computer; the average fluid temperature is compared with a set temperature; and said computer is started after confirming that the fluid temperature is set at said set temperature and that a program load and preparations for other computer starting control are completed.

21. A computer system according to claim 20, in which said cooling system comprises a flow path for feeding the fluid to said LSI chips, a pump for circulating the fluid through said flow path, and a refrigerator for cooling the fluid by heat transfer, said refrigerator having a variable cooling capacity.

22. A computer system comprising a system operating device automatically operable at a preset time, a computer, and a cooling system for cooling a LSI chips of said computer by a cooling fluid, the operations of said system operating device, said computer and said cooling system being controlled via an interface circuit, wherein said cooling system is pre-operated before a preset time of starting of said computer; the average fluid temperature is measured at the time of starting of said system operating device after the preset time of starting of said computer; said average fluid temperature is compared with a set temperature, so that the timing of command for re-starting said cooling system as well as the timing of command for operating said LSI chips is controlled; and said computer is started after confirming that the fluid temperature is set at said set temperature and that a program load and preparations for other computer starting control are completed.

23. A method of controlling a fluid temperature in a computer system comprising a system operating device, a computer, and a cooling system for cooling LSI chips of said computer by a fluid, the operations of said system operating device, said computer and said cooling system being controlled via an interface circuit, said method comprising the steps of:

measuring the average temperature of the fluid at the time of starting said system operating device, comparing said average fluid temperature with a set temperature, and controlling the timing of command for starting said cooling system and the timing of command for starting the operation of said LSI chips in accordance with said comparison, so that the fluid temperature can reach said set temperature;

starting said computer after judging that the fluid temperature is set at said set temperature and that a program load and preparations for other computer starting control are completed; and subsequently measuring the fluid temperature at predetermined time intervals, and controlling said cooling system by a PID control in accordance with said measured fluid temperature, thereby controlling the fluid temperature to said set temperature.

* * * * *